United States Patent
Hongo

(10) Patent No.: US 11,528,060 B2
(45) Date of Patent: Dec. 13, 2022

(54) WIRELESS APPARATUS, COMMUNICATION SYSTEM, AND COMMUNICATION METHOD

(71) Applicant: HITACHI KOKUSAI ELECTRIC INC., Tokyo (JP)

(72) Inventor: Naoki Hongo, Tokyo (JP)

(73) Assignee: HITACHI KOKUSAI ELECTRIC INC., Tokyo (JP)

(*) Notice: Subject to any disclaimer, the term of this patent is extended or adjusted under 35 U.S.C. 154(b) by 0 days.

(21) Appl. No.: 17/617,136

(22) PCT Filed: Jun. 18, 2020

(86) PCT No.: PCT/JP2020/023953
§ 371 (c)(1),
(2) Date: Dec. 7, 2021

(87) PCT Pub. No.: WO2020/262188
PCT Pub. Date: Dec. 30, 2020

(65) Prior Publication Data
US 2022/0271801 A1    Aug. 25, 2022

(30) Foreign Application Priority Data

Jun. 26, 2019   (JP) .............................. JP2019-119146

(51) Int. Cl.
*H04B 7/0413*     (2017.01)
*H04L 27/26*      (2006.01)

(52) U.S. Cl.
CPC ....... *H04B 7/0413* (2013.01); *H04L 27/2602* (2013.01)

(58) Field of Classification Search
CPC .. H04B 7/0408; H04B 7/0413; H04L 27/2602
See application file for complete search history.

(56) References Cited

U.S. PATENT DOCUMENTS

2002/0098799 A1*  7/2002  Struhsaker ............. H04B 7/022
                                                          455/561
2002/0147953 A1  10/2002  Catreux et al.
(Continued)

FOREIGN PATENT DOCUMENTS

JP    2005-521358 A    7/2005
JP    2008-48093 A     2/2008
(Continued)

OTHER PUBLICATIONS

International Search Report dated Sep. 1, 2020.

*Primary Examiner* — Rahel Guarino
(74) *Attorney, Agent, or Firm* — Bacon & Thomas, PLLC

(57) ABSTRACT

A wireless apparatus is configured such that: a correlation calculation unit calculates a correlation coefficient for signals received from respective antennas; and a cyclic shift control unit compares the correlation coefficient with a threshold value. If the correlation coefficient is equal to or higher than the threshold value, the cyclic shift control unit determines that there is a direct wave, allocates a common shift amount to a cyclic shift unit, and causes a beam forming unit to form and transmit a narrow beam. Meanwhile, if the correlation coefficient is lower than the threshold value, the cyclic shift control unit determines that there is no direct wave, allocates different shift amounts to the cyclic shift unit, and causes the cyclic shift unit to diversify the cyclic shift.

5 Claims, 8 Drawing Sheets

[FIG. 2] CONFIGURATION OF PRESENT WIRELESS APPARATUS

(56) References Cited

U.S. PATENT DOCUMENTS

| | | |
|---|---|---|
| 2006/0222101 A1 | 10/2006 | Cetiner et al. |
| 2006/0286974 A1 | 12/2006 | Gore et al. |
| 2008/0037680 A1 | 2/2008 | Sakata et al. |
| 2010/0098009 A1 | 4/2010 | Higuchi |
| 2015/0062335 A1 | 3/2015 | Murakami et al. |

FOREIGN PATENT DOCUMENTS

| | | |
|---|---|---|
| JP | 2008-527950 A | 7/2008 |
| JP | 2008-236428 A | 10/2008 |
| JP | 2013-123241 A | 6/2013 |
| JP | 2013-172377 A | 9/2013 |
| JP | 2015-126271 A | 7/2015 |

* cited by examiner (a) LINE-OF-SIGHT (BF)

(b) NON-LINE-OF-SIGHT (BF)

(c) NON-LINE-OF-SIGHT (CDD)

[FIGS. 1A TO 1C] OPERATION OVERVIEW OF PRESENT WIRELESS APPARATUS

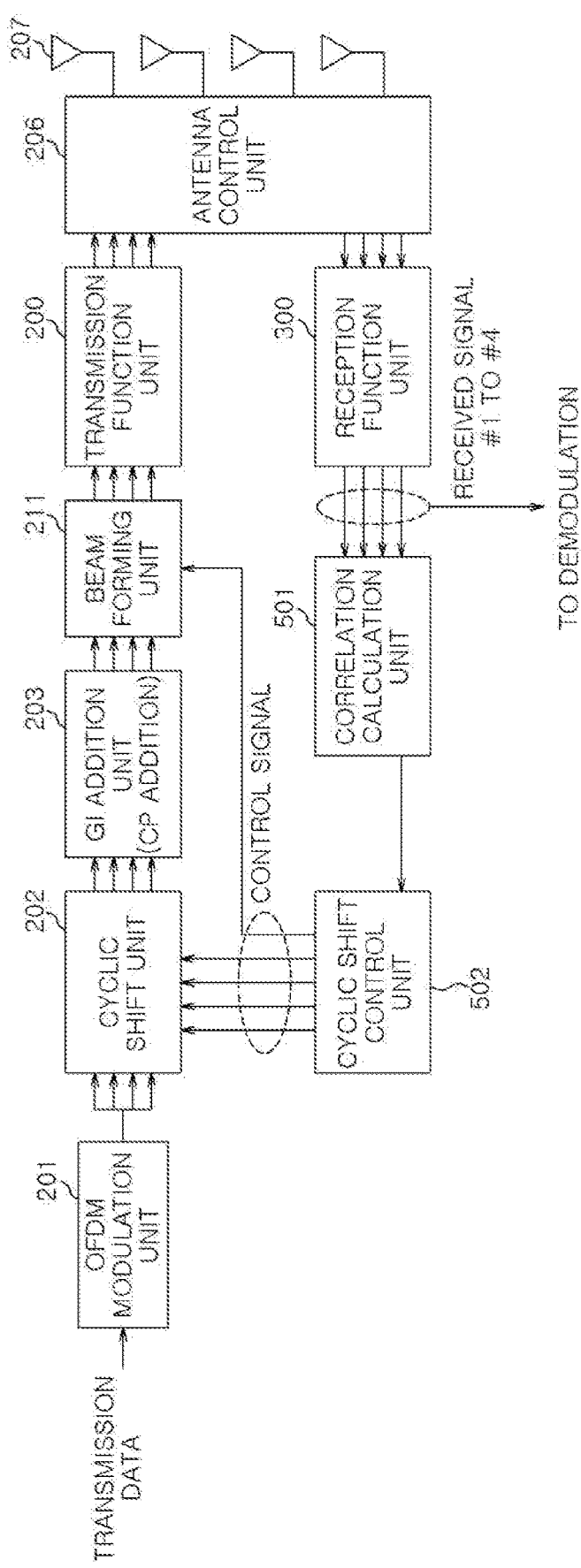
[FIG. 2] CONFIGURATION OF PRESENT WIRELESS APPARATUS

[FIG. 3] PROCESSING OF CYCLIC SHIFT CONTROL UNIT

[FIG. 4] DIRECTIVITY OF OTHER WIRELESS APPARATUS

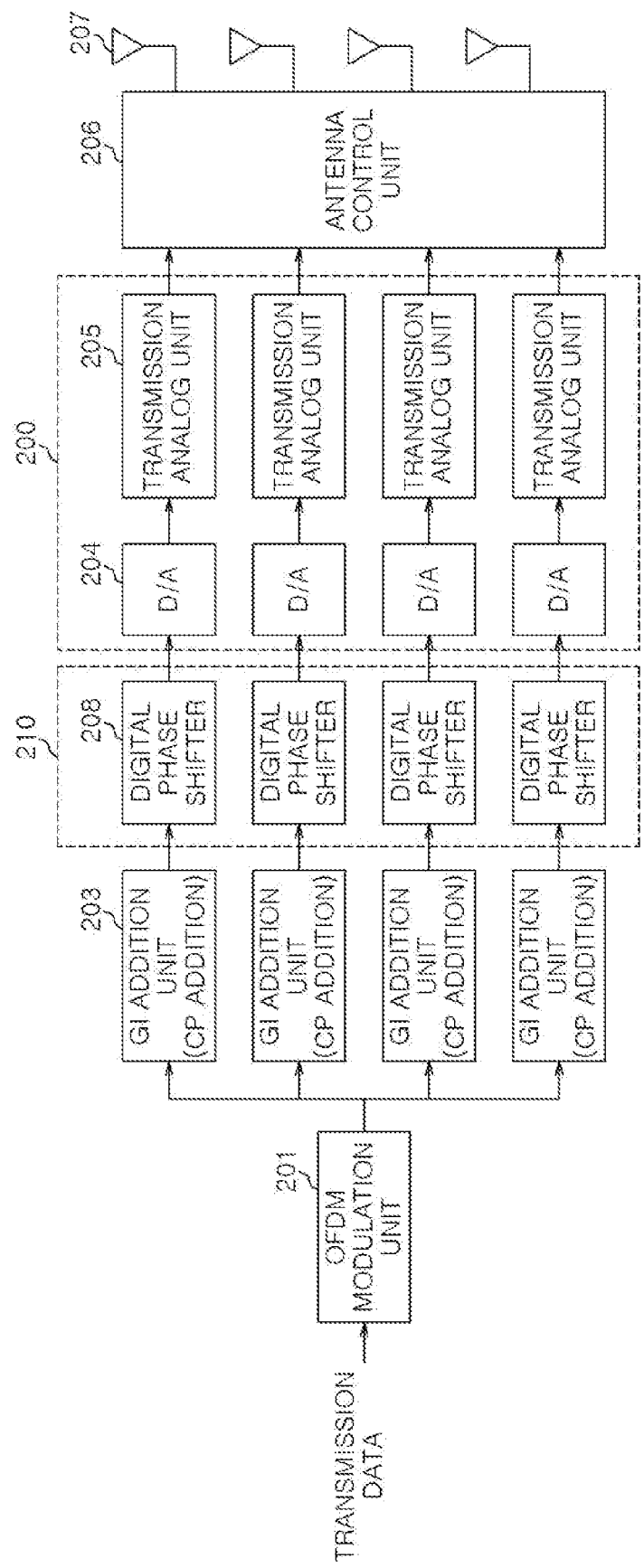
[FIG. 5] SCHEMATIC CONFIGURATION OF TRANSMISSION BLOCK USING DIGITAL BEAM FORMING TECHNOLOGY

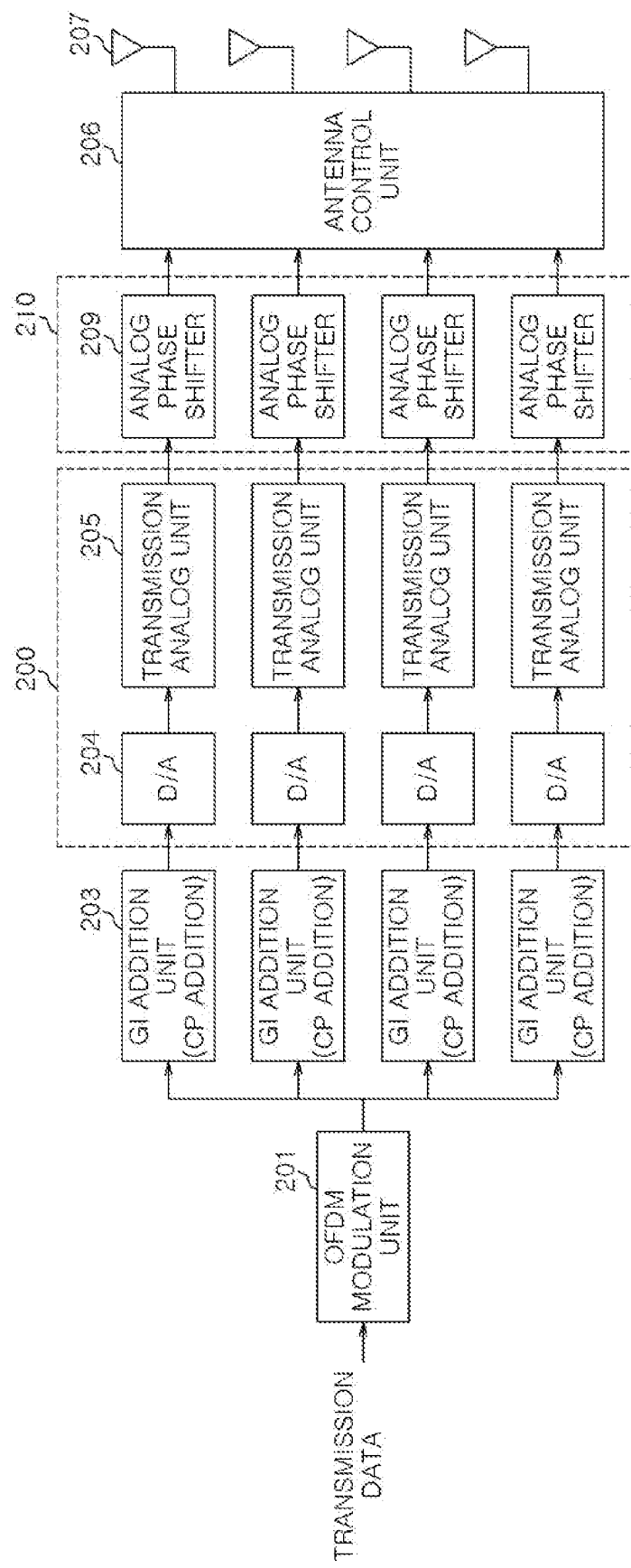

FIG. 7A
FIG. 7B
FIG. 7C
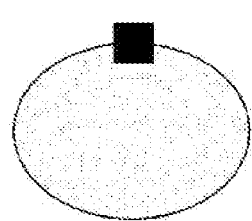
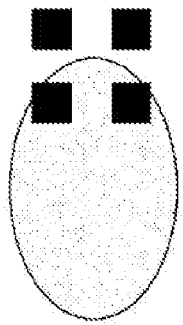
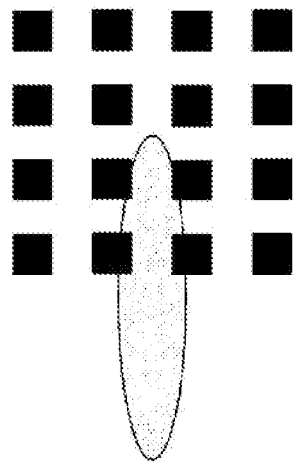
(a) ONE ANTENNA  (b) FOUR ANTENNAS  (c) SIXTEEN ANTENNAS
FIG. 7D
FIG. 7E
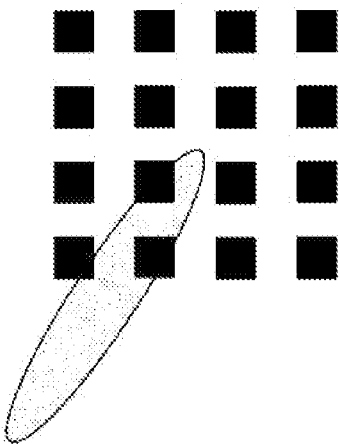
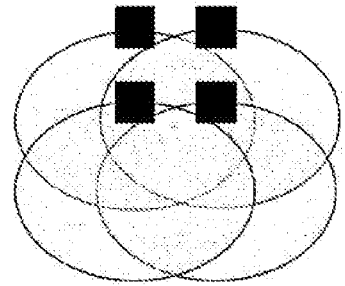
(d) SIXTEEN ANTENNAS  (e) CDD
[FIGS. 7A TO 7E] EXAMPLE OF ANTENNA DIRECTIVITY

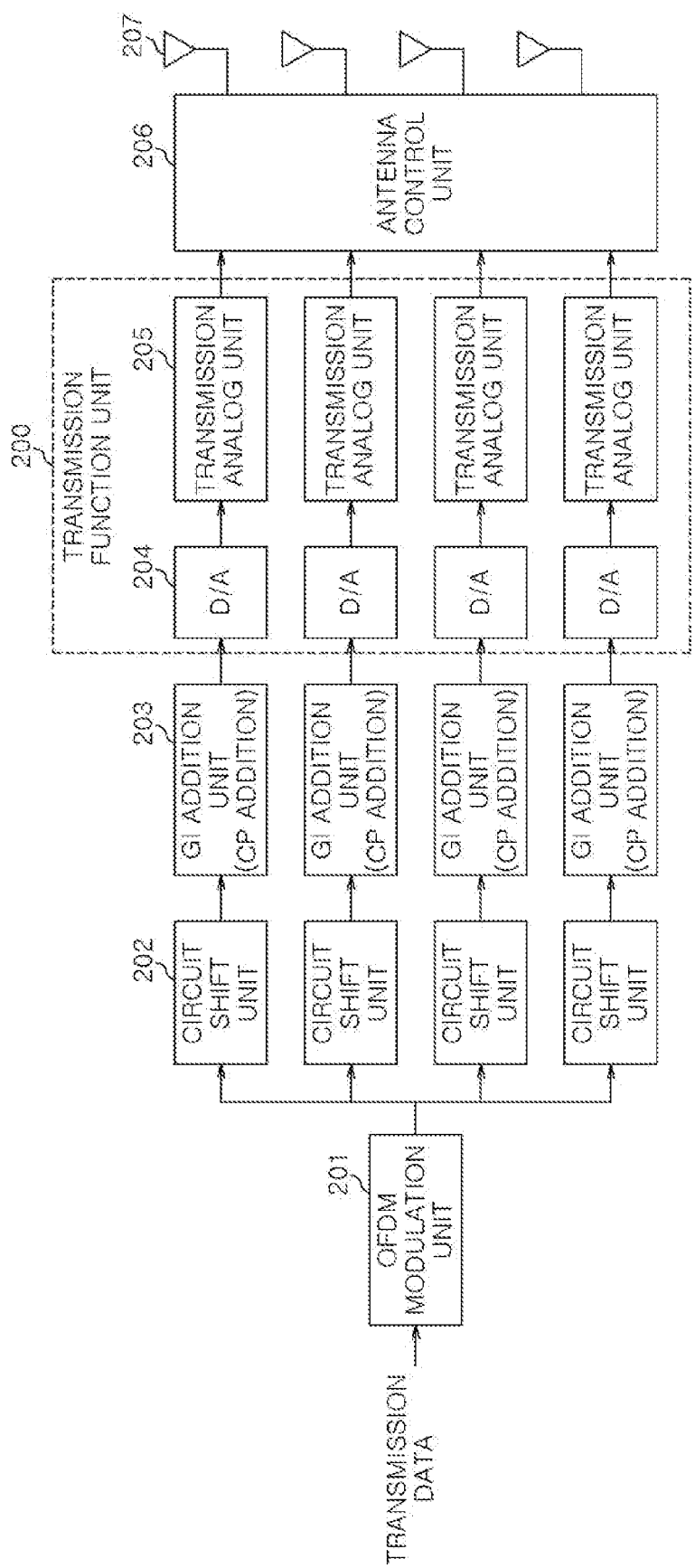

[FIG. 9] SCHEMATIC CONFIGURATION OF RECEPTION BLOCK

WIRELESS APPARATUS, COMMUNICATION SYSTEM, AND COMMUNICATION METHOD

TECHNICAL FIELD

The present invention relates to a wireless apparatus of a fixed radio wireless system having multiple antennas, and more particularly, to a wireless apparatus, a communication system, and a communication method capable of preventing disconnection of wireless communication even when there exists a shield while enabling high-speed transmission and long-distance transmission.

BACKGROUND

Description of Prior Art

As one of the wireless access systems, there is a fixed wireless access (FWA) system. The FWA is mostly based on line-of-sight (LOS) communication and is different from mobile wireless access (MWA) which is directed to mobile communication based on non-line-of-sight (NLOS) communication.

In addition, although nomadic wireless access (NWA) is nomadic, since the NWA is installed so that an area over which line-of-sight communication is performed is as wide as possible, the NWA often has a similar wireless environment to the FWA, which performs wireless communication, in the short term.

As an example of the FWA system, there is an FWA system used for direct wireless connection between switching stations or relay lines of telecommunication carriers and offices or general households.

In such a system, there are a point to multipoint (P-MP) topology that connects a base station of a telecommunication carrier and subscriber stations of a plurality of users, and a point-to-point (P-P) topology that connects a telecommunication carrier and a user one to one.

Further, the FWA system is used as a backhaul line connecting a base station and a network of the MWA system. Conventionally, it has been commonly constituted by an optical fiber capable of providing large-capacity and stable communication. However, since a large cost and many construction days are required to newly build an optical fiber, wireless lines that can be installed simply and easily at a low cost are required, and broadband FWA systems are increasingly being used in combination with optical lines.

In addition, the FWA system has an advantage in that networks can be relatively easily supplied to locations where it is difficult to install dedicated lines for communication between buildings, temporary lines for disasters or events, and optical cables, and that communication lines are not easily cut by accidents or disasters.

[Beam Forming]

In the FWA system, as technology for promoting additional high-speed transmission and long-distance transmission, beam forming (BF) technology for performing transmission and reception using multiple antennas has been known.

In the transmission BF, by controlling phases of transmitting signals radiated from multiple antennas to be spatially synthesized, in some locations, phases of radio waves radiated from the respective antennas become close to in-phase, and thus, the radio waves mutually reinforce power, and furthermore, in some locations, the radio waves radiated from the respective antennas mutually offset power. As a result, since a synthetic gain can be obtained at a location where power is mutually reinforced, a propagation loss is compensated for, and thereby the long-distance transmission is enabled.

Alternatively, since a desired signal power to noise power ratio (carrier to noise ratio, C/N ratio) increases in a receiver, the number of multiple values of quadrature amplitude modulation increases, and thereby the high-speed transmission is enabled.

[Transmission Block of Wireless Apparatus Using Digital Beam Forming: FIG. 5]

A transmission block of a wireless apparatus using beam forming will be described with reference to FIG. 5. FIG. 5 is a schematic configuration diagram of a transmission block using digital beam forming. Here, an example case where the number of antennas is four will be described. In addition, in FIG. 5, functional blocks related to beam forming are mainly described, and illustration of other functional blocks generally provided in the wireless apparatus will be omitted.

As illustrated in FIG. 5, the transmission block (transmitting mechanism, transmitting unit) using the beam forming includes an orthogonal frequency division multiplexing (OFDM) modulation unit 201, four guard interval (GI) addition units 203, four digital phase shifters 208, four digital/analog (D/A) conversion units 204, four transmission analog units 205, an antenna control unit 206, and four antennas 207. In addition, the transmission function unit 200 includes the D/A conversion unit 204 and the transmission analog unit 205.

The digital phase shifter 208 is a component of a beam forming unit 210 and performs phase rotation of a digital signal. The digital phase shifter is implemented by, for example, a complex multiplier.

The OFDM modulation unit 201 performs OFDM modulation on transmission data.

The GI addition unit 203 adds a cyclic prefix (CP) to the OFDM-modulated signal.

As for the addition of the CP, there is a method of copying a certain part of a tail of the OFDM symbol and adding the copied part before a head of the OFDM symbol. The amount to be added is designed for each system according to a delay time of a multi-path to be considered, such as ¼ or ⅛ of a length of the OFDM symbol.

The digital phase shifter 208 allocates a phase difference to four signals to perform the beam forming on the OFDM symbols transmitted from the respective antennas 207.

The D/A conversion unit 204 converts the signal to which the phase difference is allocated into an analog signal.

The transmission analog unit 205 includes a frequency conversion unit, an analog filter, a power amplifier, and the like and performs analog signal processing on each signal output from each D/A conversion unit 204.

The antenna control unit 206 controls the antenna 207.

Multiple antennas 207 are provided and radiate radio waves.

The operation of the transmission block will be briefly described.

The transmission data is OFDM-modulated by the OFDM modulation unit 201, and a CP is added by the GI addition unit 203.

The four signals to which the CP is added are allocated a phase difference by the digital phase shifter 208, D/A-converted by the D/A conversion unit 204 of the transmission function unit 200, frequency-modulated and amplified by the transmission analog unit 205, and propagated from the transmitting antenna 207 via the antenna control unit 206.

[Transmission Block of Wireless Apparatus Using Analog Beam Forming: FIG. 6]

A transmission block of a wireless apparatus using analog beam forming will be described with reference to FIG. 6. FIG. 6 is a schematic configuration diagram of the transmission block using the analog beam forming technology. An analog phase shifter 209 is provided at the rear end of the transmission function unit 200.

The analog phase shifter 209 is a component of the beam forming unit 210 and performs phase rotation of the analog signal. A difference from FIG. 5 is that the beam forming is performed in the analog unit.

[Example of Antenna Directivity: FIGS. 7A to 7E]

An example of antenna directivity will be described with reference to FIGS. 7A to 7E. FIGS. 7A to 7E are schematic explanatory diagrams illustrating an example of antenna directivity. FIGS. 7B to 7D illustrate directivity of a transmitting antenna when a narrow beam is formed by beam forming (BF), and FIG. 7E illustrates the directivity of the transmitting antenna in a case of performing cyclic delay diversity (CDD) to be described below.

Here, examples of the antenna include a planar antenna such as a patch antenna, which is widely employed in a microwave band and a millimeter wave band. The same applies to a case where antennas are arranged in units of a sub-array including multiple antennas.

FIG. 7A illustrates a single element and illustrates directivity of a single planar antenna.

FIG. 7B illustrates a case where beam forming is performed with four elements, in which, compared with one element, directivity becomes sharp, and synthetic power in a front direction is large.

FIG. 7C illustrates a case where beam forming is performed with 16 elements, in which the directivity becomes sharper, and the synthetic power in the front direction is large.

FIG. 7D illustrates 16 elements, but the phase rotation is performed so that phases of signals transmitted from respective antennas are different from those of FIG. 7C by the digital phase shifter 208, and thus, the directivity is controlled to be directed to the left rather than the front.

The P-P communication has an advantage that it can make the directivity sharp to reduce interference with other wireless apparatuses and it can perform counter communication using the same frequency to improve frequency utilization efficiency.

Similarly, the P-MP communication can make the directivity sharp to simultaneously transmit a plurality of beams to a plurality of stations at the same frequency in different directions.

In the MWA, since the wireless apparatus moves, it becomes harder to follow the beam as the directivity becomes sharper, but in the FWA or NWA, since the wireless apparatus basically does not move, there is good compatibility with the BF technology.

As for the reception BF, there are a method of maximizing a gain in an arrival direction of a desired wave when synthesizing signals received from the respective antennas, a method of minimizing a gain in an arrival direction of an interference wave, and the like.

In addition, it is also known that reception performance is improved by providing multiple antennas to perform spatial diversity. In accordance with changes in the overall environment, various studies and practical applications are also being conducted on algorithms for selecting and performing an optimal method from among these reception technologies.

[Cyclic Delay Diversity]

Here, the cyclic delay diversity (CDD), which is one of the transmission diversity technologies, will be briefly described. In addition, the CDD is also referred to as cyclic shift diversity (CSD). Here, the CDD is described as being synonymous with the CSD.

The CDD is to transmit signals transmitted from multiple antennas by allocating different cyclic delay amounts to the same data signal.

The OFDM modulation is employed in various wireless systems as a method having strong resistance to multi-path having a delay time by configuring an OFDM symbol by a plurality of sub-carriers of a narrow band orthogonal to each other, and furthermore, by adding a guard interval called cyclic prefix (CP).

[Transmission Block of Wireless Apparatus Using CDD: FIG. 8]

The transmission block of the wireless apparatus using the CDD will be described with reference to FIG. 8. FIG. 8 is a schematic configuration diagram of the transmission block using the CDD. Here, an example case where the number of antennas is four will be described. In addition, in FIG. 8, functional blocks related to the CDD are mainly described, and illustration of other functional blocks generally provided in the wireless apparatus will be omitted.

As illustrated in FIG. 8, the transmission block (transmitting mechanism and transmitting unit) using the CDD includes the OFDM modulation unit 201, the GI addition unit 203, the transmission function unit 200, and the antenna control unit 206, like the transmission block that performs the beam forming illustrated in FIGS. 5 and 6, and includes a cyclic shift unit 202 instead of the beam forming unit 210 of FIGS. 5 and 6.

Descriptions of the same components as those of FIGS. 5 and 6 will be omitted.

The cyclic shift unit 202 cyclically shifts the OFDM-modulated signal. Here, cyclic shift amounts in the four cyclic shift units 202 are each set to be different values. The cyclic shift amounts are set in advance or set by a control unit (not illustrated).

By allocating different cyclic shift amounts to OFDM symbols transmitted from the respective antennas 207 by the cyclic shift unit 202, the transmission diversity effect can be obtained. Specifically, when a distance between antennas is set sufficiently larger than a wavelength of a radio frequency, since a correlation between each received signal is reduced on a receiving side, a diversity effect can be obtained for multi-path fading.

The operation of the transmission block will be briefly described.

The transmission data is OFDM-modulated by the OFDM modulation unit 201, and is branched off into four, and then shifted by different cyclic shift amounts by the cyclic shift unit 202. A CP is added to the cyclically shifted signals by the GI addition unit 203.

The signals to which the CP is added are D/A-converted by the D/A conversion unit 204 of the transmission function unit 200, frequency-modulated and amplified by the transmission analog unit 205, and propagated from the transmitting antenna 207 via the antenna control unit 206.

[Antenna Directivity in the Case of Using CDD: FIG. 7E]

The antenna directivity in the case of the transmission using the CDD will be described with reference to FIG. 7E.

As described above, in the case of the transmission using the CDD, signals transmitted from the respective antennas are cyclically shifted by different cyclic shift amounts. This is because, when the same signal is transmitted from multiple antennas, unintended BF may occur and the diversity effect may not be obtained.

When the signals are cyclically shifted as appropriate, the directivity of the antennas becomes the same as in the case of one independent antenna as illustrated in FIG. 7E. The CDD is effective technology when using the OFDM modulation using the CP.

The CDD is also a type of beam forming, but hereinafter, forming the narrow beam is referred to as the BF and is distinguished from the CDD.

[Reception Block of Wireless Apparatus: FIG. 9]

A reception block (receiving mechanism, receiving unit) of the wireless apparatus will be described with reference to FIG. 9. FIG. 9 is a schematic configuration diagram of a reception block of a wireless apparatus. Similar to the transmission block, an example case where the number of antennas is four will be described.

The antenna 207 receives a wireless signal.

The antenna control unit 206 controls each of the antennas 207 to output the received signal to the corresponding reception analog units 301.

The reception analog unit 301 includes a low noise amplifier (LNA), an analog filter, and a frequency modulator and performs analog processing on the received signal.

The A/D conversion unit 302 converts the signal output from the reception analog unit 301 into a digital signal.

In the reception block, the signal received from the antenna 207 is frequency-modulated for respective antennas 207 by the reception analog unit 301, subjected to reception processing, converted into a digital signal by the A/D conversion unit 302, and output as received signal #1 to received signal #4.

Then, a variety of multiple-input multiple-output (MIMO) processing is performed and OFDM demodulation is performed. When the quadrature amplitude modulation or the like is performed before the OFDM modulation, the demodulation thereof is also performed.

[Communication Failure by Shield]

In the case of performing the transmission beam forming, as the number of antennas (or the number of antenna sub-arrays or the number of antenna elements) increases to make the beam directivity sharp, the performance of the high-speed and long-distance transmission is improved.

However, when a shield appears in a line-of-sight, a direct wave does not reach a receiver.

The sharper the directivity, the easier the communication is affected by the shield, and thus, the communication may be disconnected, and when the disconnection time is long, it becomes a serious communication failure.

Related Art

Also, as the related art of the radio communication device that performs the P-P communication, there is a Japanese Patent Application Laid-Open No. 2013-172377, "Radio communication device, radio communication method, and radio communication system" (Patent Document 1).

In addition, as the related art related to a base station having multiple transmitting antennas, there is Japanese Patent Application Laid-Open No. 2015-126271, "Base station" (Patent Document 2).

Patent Document 1 discloses a radio communication device that detects and notifies an obstacle by capturing a range in which radio wave communication is "prospected" and comparing the captured image with a reference image.

Patent Document 2 discloses a base station that estimates an effective state of a propagation path, estimates communication quality of the propagation path, and determines a transmission mode of any one of transmission diversity, transmission beam forming, Closed-Loop MIMO, and Open-Loop MIMO based on the estimated result.

PRIOR ART DOCUMENTS

Patent Documents

Patent Document 1: Japanese Patent Application Laid-Open No. 2013-172377
Patent Document 2: Japanese Patent Application Laid-Open No. 2015-126271

SUMMARY

Problems to be Resolved by the Invention

As described above, in the conventional wireless apparatus, in the case where the beam forming is performed, when a shield exists in a line-of-sight, there is a problem that there is a possibility that a serious communication failure, such as disconnection of communication, occurs.

In addition, Patent Document 1 and Patent Document 2 do not describe switching a transmission mode to the beam forming or the cyclic delay diversity (CDD) by detecting the presence or absence of the direct wave based on a value of a correlation coefficient for the signals received from multiple antennas.

The present invention is directed to providing a wireless apparatus, a communication system, and a communication method capable of improving reliability by preventing disconnection of communication while enabling high-speed and long-distance transmission.

Means for Solving the Problem

In order to solve the conventional problems described above, the present invention provides a wireless apparatus that is used in a fixed wireless access system, includes multiple antennas, and performs transmission and reception in an orthogonal frequency division multiplexing (OFDM) modulation scheme, the wireless apparatus including: a direct wave detection unit that detects presence or absence of a direct wave based on signals received from multiple antennas; a plurality of cyclic shift units that are provided corresponding to the multiple antennas and shift phases of the signals transmitted from the antennas by a specific shift amount; and a beam forming unit that performs a phase rotation on the signals transmitted from the antennas to generate a narrow beam, wherein the direct wave detection unit controls the plurality of cyclic shift units and the beam forming unit to generate the narrow beam when a direct wave is detected, and controls the plurality of cyclic shift units and the beam forming unit to perform cyclic shift diversity without generating the narrow beam when no direct wave is detected.

In addition, according to the present invention, in the wireless apparatus, the direct wave detection unit includes a correlation calculation unit that calculates a correlation coefficient for the signals received from the multiple antennas, and a cyclic shift control unit that determines the presence or absence of the direct wave based on a value of the correlation coefficient, sets the same shift amount for the plurality of cyclic shift units when the direct wave is detected, and sets different shift amounts for the plurality of cyclic shift units when no direct wave is detected.

In addition, according to the present invention, in the wireless apparatus, the cyclic shift control unit determines that the direct wave is detected when the value of the correlation coefficient is greater than or equal to a preset threshold value and determines that the direct wave is not detected when the value of the correlation value is smaller than the threshold value.

In addition, the present invention provides a fixed wireless access system including a first wireless apparatus as described above, and a second wireless apparatus including multiple antennas, wherein the first wireless apparatus transmits information of a transmission mode to the second wireless apparatus when performing transmission of either beam forming or cyclic shift diversity based on a received signal, and the second wireless apparatus performs transmission by performing beam forming or cyclic shift diversity based on the information of the transmission mode received from the first wireless apparatus.

In addition, the present invention relates to a communication method used in a fixed wireless access system performing transmission and reception in an OFDM modulation scheme, the communication method including: detecting, by a wireless apparatus having multiple antennas, presence or absence of a direct wave based on signals received from the multiple antennas; when the direct wave is detected, generating and transmitting a narrow beam by performing beam forming; and when no direct wave is detected, performing transmission by performing cyclic shift diversity.

Effect of the Invention

According to the present invention, a wireless apparatus used in a fixed wireless access system includes multiple antennas and performs transmission and reception in an OFDM modulation scheme. The wireless apparatus includes a direct wave detection unit that detects presence or absence of a direct wave based on signals received from multiple antennas, a plurality of cyclic shift units that are provided corresponding to the multiple antennas and shift phases of signals transmitted from the antennas by a specific shift amount, and a beam forming unit that performs a phase rotation on the signals transmitted from the antennas to generate a narrow beam, wherein the direct wave detection unit controls the plurality of cyclic shift units and the beam forming unit to generate the narrow beam when a direct wave is detected and the direct wave detection unit controls the plurality of cyclic shift units and the beam forming unit to perform cyclic shift diversity without generating the narrow beam when no direct wave is detected, thereby improving reliability by enabling high-speed and long-distance transmission when there is no shield in a line-of-sight and preventing disconnection of communication due to a diversity effect by a multi-path when there exists a shield.

In addition, according to the present invention, in a wireless apparatus, a cyclic shift control unit determines that a direct wave is detected when a value of a correlation coefficient is greater than or equal to a preset threshold value and determines that no direct wave is detected when the value of the correlation coefficient is smaller than the threshold value, thereby detecting the presence or absence of the direct wave with a simple and easy configuration and processing.

Further, according to the present invention, a fixed wireless access system that includes a first wireless apparatus as described above and a second wireless apparatus having multiple antennas is provided as a communication system in which the first wireless apparatus transmits information of a transmission mode to the second wireless apparatus when performing transmission of either beam forming or cyclic shift diversity based on a received signal, and the second wireless apparatus performs transmission by performing beam forming or cyclic shift diversity based on the information of the transmission mode received from the first wireless apparatus, and thus, one wireless apparatus selects the transmission mode based on the presence or absence of the direct wave and informs the other wireless apparatus of the selected transmission mode, thereby simply and easily configuring a system that enables high-speed and long-distance transmission when there is no shield and prevents disconnection of communication when there exists a shield.

In addition, according to the present invention, a communication method used in a fixed wireless access system that performs transmission and reception in an OFDM modulation scheme is performed by a communication system in which a wireless apparatus having multiple antennas detects presence or absence of a direct wave based on signals received from the multiple antennas, and generates and transmits a narrow beam by performing beam forming when the direct wave is detected, and performs transmission by performing cyclic shift diversity when no direct wave is detected, thereby enabling high-speed and long-distance transmission when there is no shield and preventing disconnection of communication when the shield appears.

BRIEF DESCRIPTION OF THE DRAWINGS

FIG. 2 is a block configuration diagram of the present wireless apparatus.

FIG. 5 is a schematic configuration diagram of a transmission block using a digital beam forming technology.

FIG. 6 is a schematic configuration diagram of a transmission block using analog beam forming technology.

FIGS. 7A to 7E are schematic explanatory diagrams illustrating an example of antenna directivity.

FIG. 8 is a schematic configuration diagram of a transmission block using cyclic delay diversity (CDD).

DETAILED DESCRIPTION

Embodiments of the present invention will be described with reference to the accompanying drawings.

[Overview of Embodiment]

A wireless apparatus according to an embodiment of the present invention (the present wireless apparatus) includes multiple antennas, a plurality of cyclic shift units that are provided corresponding to the antennas and allocate a cyclic shift to signals transmitted from respective antennas, and a cyclic shift control unit that controls shift amounts of the transmitting signals in each cyclic shift unit, and a correlation calculation unit that calculates a correlation coefficient for signals received from the respective antennas, in which the correlation calculation unit calculates the correlation coefficient for the signals received from the respective antennas, and the cyclic shift control unit detects a presence or absence of a direct wave based on the correlation coefficient, allocates a common shift amount to the transmitting signals to the cyclic shift unit when there is the direct wave and forms and transmits a narrow beam by beam forming, allocates different shift amounts to the cyclic shift unit when there is no direct wave to perform cyclic shift diversity, so as to enable high-speed and long-distance transmission when there is no shield in a line-of-sight and prevents disconnection of communication due to a diversity effect by a multi-path when there exists a shield, thereby improving reliability.

Further, a communication system according to the embodiment of the present invention (the present communication system) is a fixed wireless access system including the present wireless apparatus, and a communication method according to the embodiment of the present invention is a communication method performed by the present wireless apparatus.

Figure 1A:
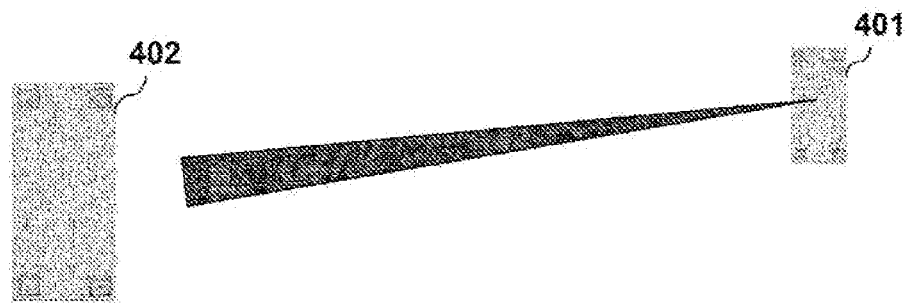
FIGS. 1A to 1C are schematic explanatory diagrams illustrating an overview of an operation of the present wireless apparatus.
Figure 1B:
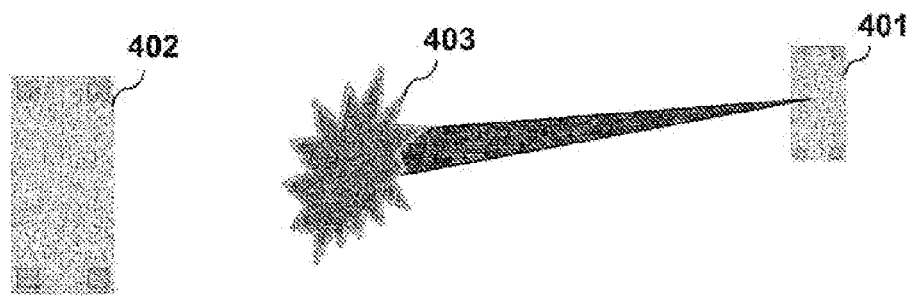
Figure 1C:
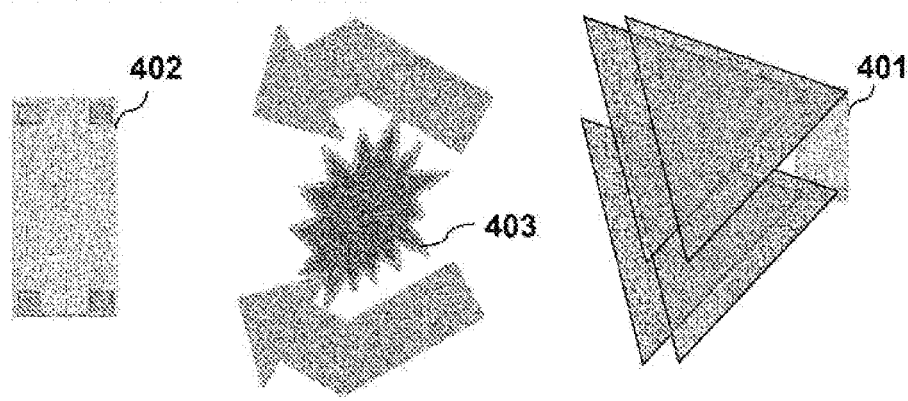

[Operation Overview of Present Wireless Apparatus: FIGS. 1A to 1C]

Before describing the configuration of the present wireless apparatus, an overview of the operation will be described with reference to FIGS. 1A to 1C. FIGS. 1A to 1C are schematic explanatory diagrams showing the operation overview of the present wireless apparatus.

FIGS. 1A to 1C schematically illustrate communication in FWA and illustrate a state in which a wireless apparatus 401 with an antenna on the right and a wireless apparatus 402 with an antenna on the left perform point-to-point (P-P) communication, where a case of transmission from the wireless apparatus 401 to the wireless apparatus 402 is illustrated. The wireless apparatus 401 is the present wireless apparatus.

FIG. 1A illustrates a case in which communication is line-of-sight communication, and the wireless apparatus 401 generates a narrow beam by beam forming and transmits the narrow beam. In this state, high-speed and long-distance transmission is possible.

FIG. 1B illustrates a case in which a shield 403 appears in the line-of-sight (non-line-of-sight communication), and the narrow beam is blocked by the shield 403 and does not reach the wireless apparatus 402, so the communication is disconnected.

Therefore, as illustrated in FIG. 1C, when the communication becomes the non-line-of-sight, the wireless apparatus 401 switches to cyclic delay diversity (CDD) to perform communication. The switch of communication is performed by detecting the presence or absence of a direct wave. Thereby, since the multi-paths such as reflected waves reach the wireless apparatus 402 even when the shield 403 is present, the disconnection of communication may be avoided.

The operation of the present wireless apparatus is performed as described above.

[Configuration of Present Wireless Apparatus: FIG. 2]

Next, the configuration of the present wireless apparatus will be described with reference to FIG. 2. FIG. 2 is a block configuration diagram of the present wireless apparatus. In addition, the same reference numbers are attached to like components in those of the related art, and detailed description thereof will be omitted.

As illustrated in FIG. 2, the present wireless apparatus includes the OFDM modulation unit 201, the cyclic shift unit 202, the GI addition unit 203, the beam forming unit 211, the transmission function unit 200, the antenna control unit 206, the antenna 207, and the reception function unit 300 as components similar to those of the related art and includes a correlation calculation unit 501 and a cyclic shift control unit 502 as characteristic parts of the present wireless apparatus.

A configuration in which the correlation calculation unit 501 and the cyclic shift control unit 502 are combined corresponds to a direct wave detection unit described in the claims.

Further, an example case in which four antennas are provided as the antenna 207 will be described here. In addition, function blocks such as automatic gain control (AGC) and automatic frequency control (AFC) may be inserted.

In addition, here, the beam forming unit 211 including the digital phase shifter 208 may be provided at a front end of the transmission function unit 200, but the beam forming unit 211 including the analog phase shifter 209 may be provided at a rear end of the transmission function unit 200. In addition, the digital phase shifter 208 and the analog phase shifter 209 may be each inserted before and after the transmission function unit 200.

As a characteristic of the present wireless apparatus, the beam forming unit 211 performs beam forming according to the instructions from the cyclic shift control unit 502 to be described below. Such operation will be described below.

The cyclic shift units 202 are provided for respective antennas 207 as in the related art (here, four) and cyclically shift the OFDM-modulated transmitting signal in units of symbols, but, in the present wireless apparatus, the cyclic shift amount of each cyclic shift unit 202 is set to be the shift amount allocated from the cyclic shift control unit 502.

The antennas 207 are an antenna for both transmission and reception, and the transmission and reception are separated by the antenna control unit 206.

The antenna control unit 206 controls transmission and reception to be switched for the respective antennas, and in the case of a time division duplex (TDD) system, the transmission and reception are switched by a TDD switch or the like, and in the case of a frequency division duplex (FDD), a duplexer is provided to switch frequencies for transmission and reception.

Further, like the transmission block illustrated in FIG. 8, four GI addition units 203 are also provided, and the transmission function unit 200 is provided with four D/A conversion units and four transmission analog units.

Similarly, the reception function unit 300 is provided with four reception analog units and four A/D conversion units.

The characteristic parts of the present wireless apparatus will be described in detail.

The correlation calculation unit 501 calculates a correlation between signals received from multiple antennas 207.

Specifically, the signals received from the antenna 207 are subjected to reception processing by the reception function unit 300, A/D converted, and input to the correlation calculation unit 501, and then, the correlation calculation unit 501 calculates the correlation coefficient for the signals received between the respective antennas.

There are various methods for calculating the correlation coefficient, such as a method of obtaining a temporal correlation of received signals or a method of obtaining a transfer function using a reference signal (known signal), and any of the methods may be used.

The correlation coefficient is generally normalized to 0.0 to 1.0, and 0.0 refers to no correlation and 1.0 refers to the same signal.

In the FWA system, in the case of line-of-sight communication, the power of the direct wave becomes dominant and it approaches the entire free space so that the correlation coefficient for the signals received from the respective antennas 207 becomes large.

On the other hand, in the case of the non-line-of-sight communication, the multi-path communication such as reflected waves is performed, and when the distance between the antennas 207 is sufficiently larger than the wavelength of the radio frequency, the correlation coefficient for the signals received from the respective antennas 207 becomes small.

The cyclic shift control unit 502 is a feature part of the present wireless apparatus and receives the correlation coefficient from the correlation calculation unit 501, and based on the received correlation coefficient, sets the cyclic shift amounts in the cyclic shift unit 202 corresponding to the respective antennas 207.

Specifically, the cyclic shift control unit 502 compares the input correlation coefficient with a preset threshold value, determines that there is a direct wave when the correlation coefficient is greater than or equal to the threshold value, and sets the same cyclic shift amount in the cyclic shift unit 202 corresponding to each antenna 207 and instructs the beam forming unit 211 to allocate a phase difference to the transmitting signals from the respective antennas to generate a narrow beam (to perform BF processing). As a result, the transmission from the transmission block is made with the narrow beam.

In addition, when the input correlation coefficient is smaller than the threshold value, it is determined that there is no direct wave, and a different cyclic shift amount is set in each cyclic shift unit 202, and the beam forming unit 211 is instructed not to perform BF processing. Thereby, the CDD is performed and the BF is not performed.

For example, when the threshold value is 0.4 and the correlation coefficient is greater than or equal to 0.4, in order to perform the BF, the cyclic shift control unit 502 equalizes the cyclic shift amount of the signals transmitted from the antennas 207. By generating and transmitting the narrow beam by the BF, the high-speed transmission is enabled, and interference with other wireless apparatuses may be reduced.

In order to perform the CDD when the correlation coefficient is less than 0.4, the cyclic shift control unit 502 sets the cyclic shift amounts of the signals transmitted from the respective antennas 207 to different values by at least one sample or more and instructs the beam forming unit 211 not to conduct the BF. In other words, the cyclic shift amounts of all the cyclic shift units 202 are set to be different. The closer the correlation between the antennas is to no correlation, the greater the effect of spatial diversity is.

[Operation of Present Wireless Apparatus: FIG. 2]

An operation of the present wireless apparatus will be briefly described with reference to FIG. 2.

Since the present wireless apparatus is characterized by the operation of the present wireless apparatus based on the received signal, the present wireless apparatus will be described from the operation of the reception block.

The signal received from the antenna 207 is down-converted by the reception function unit 300, A/D-converted, and branched off into two, and one of the branched signal is input to a demodulation unit (not illustrated) and subjected to normal demodulation to obtain receiving data.

The other branched signal is input to the correlation calculation unit 501, as a characteristic of the present wireless apparatus, and the correlation coefficient for the signals received from the respective antennas 207 is calculated, which is in turn input to the cyclic shift control unit 502.

Then, in the cyclic shift control unit 502, the correlation coefficient is compared with a threshold value, and when the correlation coefficient is greater than or equal to the threshold value, the cyclic shift control unit 502 sets the same cyclic shift amount in the cyclic shift units 202 corresponding to the respective antennas 207 and causes the beam forming unit 211 to perform the BF operation.

In addition, when the correlation coefficient is less than the threshold value, the cyclic shift control unit 502 sets different cyclic shift amounts in the cyclic shift units 202 corresponding to the respective antennas 207 and instructs the beam forming unit 211 not to perform the BF.

Since the operation of the transmission block is the same as in the related art except that the cyclic shift units 202 shift the transmitting signals by the cyclic shifts amount set from the cyclic shift control unit 502, the operation of the transmission block will be omitted.

When the transmitting signals are shifted by the same cyclic shift amount in the cyclic shift units 202 corresponding to the respective antennas 207, the BF is performed in the antennas 207 at the time of the transmission, and the high-speed transmission is enabled.

On the other hand, in each cyclic shift unit 202, when the transmitting signal is shifted by a different cyclic shift amount, it becomes the CDD, and the effect of the spatial diversity can be obtained.

In this way, the operation of the present wireless apparatus is performed.

[Selection of Transmission Mode of Present Wireless Apparatus]

Here, the selection of the transmission mode of the BF or the CDD in the present wireless apparatus will be described. It is assumed that a wireless apparatus A and a wireless apparatus B face each other to perform the P-P communication.

The wireless apparatus A and the wireless apparatus B both are the present wireless apparatus and each independently switches the transmission mode to either BF or CDD. The following states (1) to (4) will be described.

(1) When the transmission mode of the wireless apparatus A is the BF and there is no shield, since the correlation of the received signal in the wireless apparatus B is large, the wireless apparatus B selects the BF.

(2) When the transmission mode of the wireless apparatus A is the BF and there exists a shield, since the correlation of the received signal in the wireless apparatus B is small, the wireless apparatus B selects the CCD.

(3) When the transmission mode of the wireless apparatus A is the CCD and there is no shield, although the power of the received signal in the wireless apparatus B is smaller than (1) but the correlation of the received signal is large, the wireless apparatus B selects the BF.

(4) When the transmission mode of the wireless apparatus A is the CCD and there exists a shield, since the correlation of the received signal in the wireless apparatus B is small, the wireless apparatus B selects the CCD.

The same is applied when the wireless apparatus B becomes the transmitting side and the wireless apparatus A becomes the receiving side, and the wireless apparatus A switches the transmission mode in the apparatus to which the wireless apparatus A belongs to the BF or the CDD based on the correlation coefficient for the received signals.

State (1) is a normal state when there is no shield, and both the wireless apparatuses A and B perform the BF. State (4) is a normal state when there is a shield, and both the wireless apparatuses A and B perform the CDD.

State (2) is a transition state when the shield appears and soon becomes state (4).

State (3) is a transition state when the shield disappears and soon becomes state (1).

Figure 3:
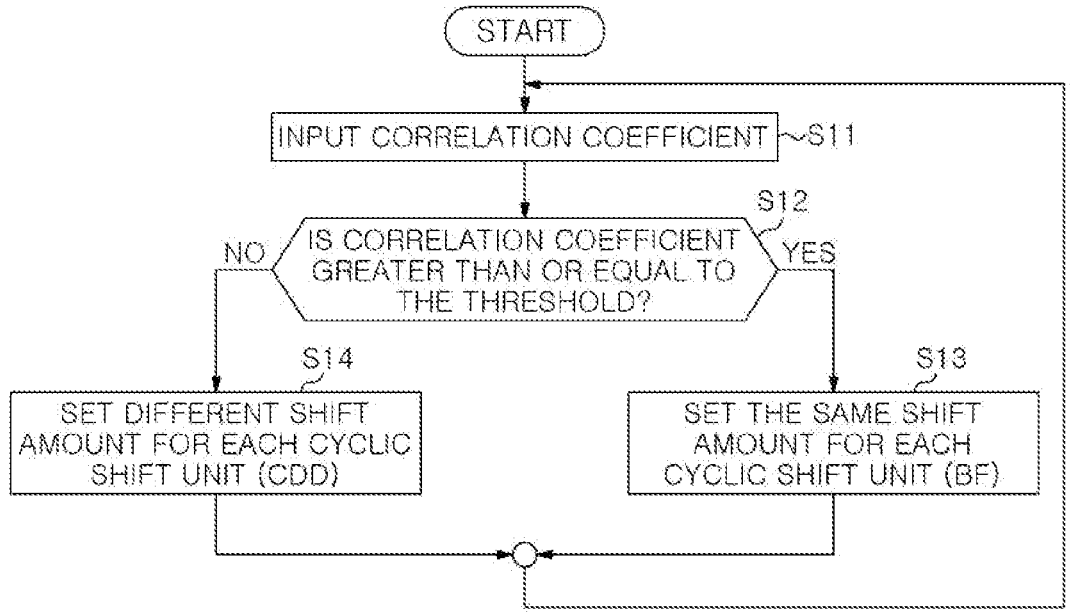
FIG. 3 is a flowchart illustrating processing in a cyclic shift control unit.

[Processing in Cyclic Shift Control Unit: FIG. 3]

The processing in the cyclic shift control unit 502 of the present wireless apparatus will be described with reference to FIG. 3. FIG. 3 is a flowchart illustrating processing in the cyclic shift control unit.

As illustrated in FIG. 3, when the correlation coefficient is input from the correlation calculation unit 501 (S11), the cyclic shift control unit 502 determines whether the correlation coefficient is greater than or equal to a preset threshold value (S12).

In operation S11, when the correlation coefficient is greater than or equal to the threshold value (in the case of Yes), the cyclic shift control unit 502 sets the cyclic shift amounts of respective cyclic shift units 202 to be the same and instructs the beam forming unit 211 to allocate a phase difference to the signals transmitted from the respective antennas (S13), and the process returns to S11. In this case, the BF is performed by the antennas 207, and a narrow beam is generated and transmitted.

In addition, in operation S11, when the correlation coefficient is less than the threshold value (in the case of No), the cyclic shift control unit 502 sets the shift amount of each cyclic shift unit 202 to be different and instructs the beam forming unit 211 not to allocate a phase difference to the signals transmitted from the respective antennas (S14), and the process returns to S11. In this case, a narrow beam is not generated, and the respective antennas 207 perform transmission by the CDD with the same directivity as in the case of being alone.

The shift amount according to the value of the correlation coefficient is set to the cyclic shift control unit 502 in advance.

In this way, the processing in the cyclic shift control unit 502 is performed.

[Effect of Embodiment]

According to the present wireless apparatus and the present communication method, a wireless apparatus includes multiple antennas 207 that transmit and receive wireless signals, the plurality of cyclic shift units 202 that are provided corresponding to the respective antennas 207 and allocate a cyclic shift to the transmitting signals from the respective antennas 207, the cyclic shift control unit 502 that controls the shift amount of the transmitting signal in each cyclic shift unit 202, and the correlation calculation unit 501 that calculates the correlation coefficient for the received signals by the respective antennas 207, in which the correlation calculation unit 501 calculates the correlation coefficient for the received signals by the respective antennas 207, and the cyclic shift control unit 502 compares the correlation coefficient with a threshold value, and when the correlation coefficient is greater than or equal to the threshold value, determines that a direct wave is present and allocates the common shift amount to the cyclic shift unit 202 and forms and transmits a narrow beam by the beam forming, and when the correlation coefficient is less than the threshold value, determines that there is no direct wave and allocates different shift amounts to the cyclic shift units 202 and performs the cyclic shift diversity, thereby improving the reliability by enabling the high-speed and long-distance transmission when there is no shield in the line-of-sight and preventing the disconnection of communication due to the diversity effect by the multi-path when there exists a shield.

In addition, according to the present communication system, there is provided a fixed wireless access system including the present wireless apparatus and, when there is no shield in the line-of-sight, transmission is performed by performing the beam forming to enable the high-speed and long-distance transmission, and when the shield appears, transmission is performed by performing the cyclic shift diversity to prevent the disconnection of communication due to the diversity effect by the multi-path, thereby improving the reliability.

In addition, according to the present wireless apparatus, since each wireless apparatus independently determines to switch between the BF and the CDD, a special reference signal is not required and, furthermore, it can be applied to both a TDD method and a FDD method, and thus, can easily be applied to various systems.

In addition, in the above example, the presence or absence of a direct wave is detected by obtaining the correlation coefficient for the signals received from the multiple antennas, but the received electric field strength can be obtained from the received signals, and the presence or absence of the direct wave can be detected based on the strength of the received electric field strength.

Application Example

An application example of the present communication system will be described.

In the above-described communication system, each wireless apparatus calculates the correlation coefficient to detect the presence or absence of a direct wave and determine whether the transmission mode is the BF or the CDD. However, for example, as in the case of a master station and a slave station, when one wireless apparatus controls a radio link, only the master station may perform the operation.

For example, when the master station is the present wireless apparatus, according to the method described above, the master station detects the presence or absence of the direct wave based on the correlation coefficient of the received signals, and the master station determines that the transmission mode is the BF when there is a direct wave, or the transmission mode is the CDD when there is no direct wave.

In addition, the slave station is instructed of the determined transmission mode. The instruction of the transmission method is transmitted by being included in control information or the like.

In other words, in the case of a P-P communication, even when both apparatuses are not the present wireless apparatus, when any one of the apparatuses is the present wireless apparatus, the apparatus detects the presence or absence of a direct wave from the received signals to select the BF or the CDD, and instructs the transmission mode to the other wireless apparatus.

As a result, the present system can be constructed simply and easily, and when there is no shield, performs the transmission by the BF to enable the high-speed transmission, and when there is a shield, transmits the transmission by the CDD to prevent the disconnection of communication, thereby providing the reliability.

Other Embodiments

Figure 4:
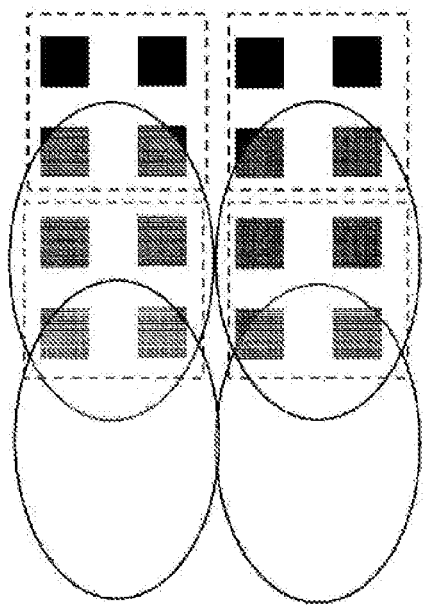
FIG. 4 is an explanatory diagram illustrating antenna directivity of another wireless apparatus.
Figure 9:
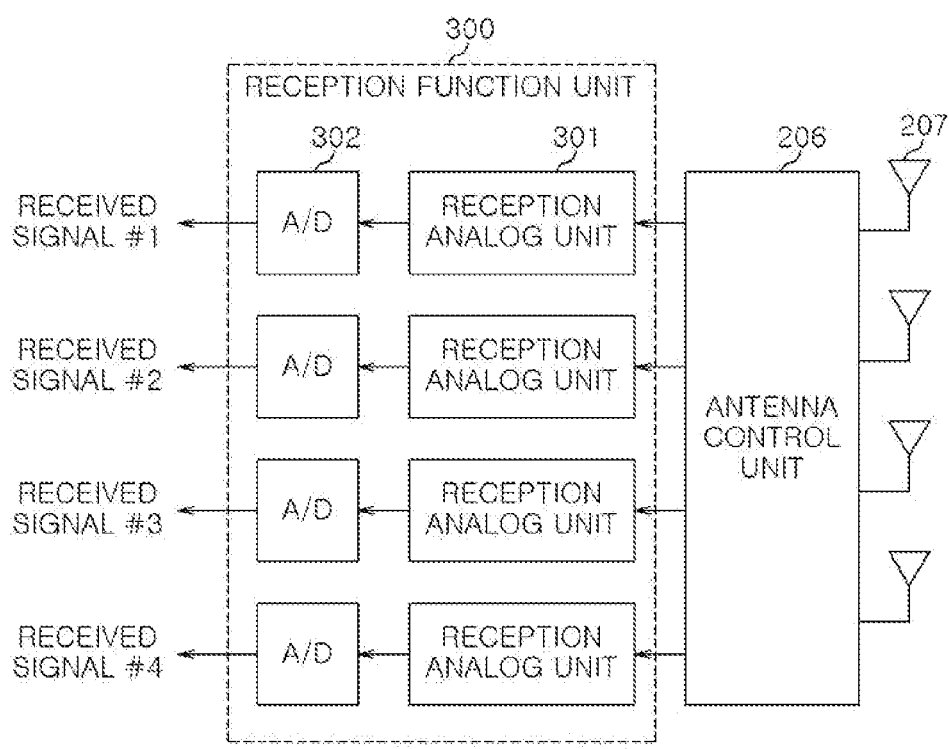
FIG. 9 is a schematic configuration diagram of a reception block of the wireless apparatus.

Next, a wireless apparatus according to another embodiment of the present invention (further wireless apparatus)

will be described with reference to FIG. 4. FIG. 4 is an explanatory diagram illustrating antenna directivity of another wireless apparatus.

The further wireless apparatus performs the BF while obtaining the effect of the transmission diversity, and the basic configuration is the same as that of the wireless apparatus described above, except that the configuration of the antenna is different.

The further wireless apparatus is provided with a plurality of groups including multiple antennas as illustrated in FIG. 4.

Here, it is assumed that four groups including four planar antennas are provided.

As the characteristic of the further wireless apparatus, the cyclic shift unit 202 is provided corresponding to each group and gives the cyclic shift amount set by the cyclic shift control unit 502 to the transmitting signals of all antennas in the group. In other words, the signals transmitted from the antennas in the same group have the same cyclic shift amount.

Further, in the further wireless apparatus, when the cyclic shift control unit 502 determines that the correlation coefficient is greater than or equal to a threshold value and there is a direct wave, the cyclic shift control unit 502 allocates the same cyclic shift amount to different groups.

In addition, in the further wireless apparatus, the beam forming unit 211 always performs BF within the same group.

In addition, when the cyclic shift control unit 502 determines that there is a direct wave, the beam forming unit 211 allocates a phase difference so as to perform the BF even between groups.

In this case, since all 16 antennas have the same cyclic shift amount and the BF is also performed between groups, for example, sharp directivity as illustrated in FIG. 7C can be obtained, thereby enabling the high-speed transmission.

On the other hand, when the cyclic shift control unit 502 determines that the correlation coefficient is less than the threshold value and there is no direct wave, the cyclic shift unit 202 allocates a different cyclic shift amount by one sample or more to each cyclic shift unit 202. Thereby, different cyclic shift amounts are allocated to different groups, and the CDD is performed between the groups. Even when there is no direct wave, the BF is performed within the group as described above.

In this case, as illustrated in FIG. 4, the antenna directivity of the further wireless apparatus generates four beams that have intermediate characteristics of those shown in FIGS. 7C and 7E, thereby obtaining a diversity effect, and when a shield appears, the disconnection of communication can be prevented.

[Effect of Other Embodiments]

A still further wireless apparatus includes a cyclic shift unit 202 that includes a plurality of groups including multiple antennas and allocates the same cyclic shift amount to signals transmitted from the antennas in the groups corresponding to each group, and a beam forming (BF) unit performing BF in the group, in which a cyclic shift control unit 502 controls the beam forming unit to perform the BF between the groups while allocating the same cyclic shift amount to all the cyclic shift unit 202 upon determining that there is a direct wave and controls the beam forming unit not to perform the BF between the groups while allocating different cyclic shift amounts to all the cyclic shift units 202 upon determining that there is no direct wave so as to enable higher-speed and long-distance transmission by making directivity sharp when there is no shield in a line-of-sight and obtain a diversity effect between the groups even when there is a shield, thereby improving reliability by preventing disconnection of communication.

This application claims the benefit of priority on the basis of Japanese Patent Application 2019-119146 filed on Jun. 26, 2019, the disclosure of which is incorporated herein by reference in its entirety.

INDUSTRIAL APPLICABILITY

The present invention is suitable for a wireless apparatus of a fixed wireless access system, a communication system, and a communication method that can prevent disconnection of wireless communication even when there is a shield while enabling high-speed and long-distance transmission.

DESCRIPTION OF REFERENCE NUMERALS

200: Transmission function unit, 201: OFDM modulation unit, 202: Cyclic shift unit, 203: GI addition unit, 204: D/A conversion unit, 205: Transmission analog unit, 206: Antenna control unit, 207: Antenna, 208: Digital phase shifter, 209: Analog phase shifter, 210, 211: Beam forming unit, 300: Reception function unit, 301: Reception analog unit, 302: A/D conversion unit, 401, 402: Wireless apparatus, 403: Shield, 501: Correlation calculation unit, 502: Cyclic shift control unit

The invention claimed is:

1. A wireless apparatus that is used in a fixed wireless access system, includes multiple antennas, and performs transmission and reception in an orthogonal frequency division multiplexing (OFDM) modulation scheme, the wireless apparatus comprising:
a direct wave detection unit that detects presence or absence of a direct wave based on received signals from the multiple antennas;
a plurality of cyclic shift units that are provided corresponding to the multiple antennas and shift phases of signals transmitted from the antennas by a specific shift amount; and
a beam forming unit that performs a phase rotation on the signals transmitted from the antennas to generate a narrow beam,
wherein the direct wave detection unit controls the plurality of cyclic shift units and the beam forming unit to generate the narrow beam when the direct wave is detected and controls the cyclic shift units and the beam forming unit to perform cyclic shift diversity without generating the narrow beam when no direct wave is detected.

2. The wireless apparatus according to claim 1, wherein the direct wave detection unit includes a correlation calculation unit that calculates a correlation coefficient for the signals received from the multiple antennas, and a cyclic shift control unit that determines the presence or absence of the direct wave based on a value of the correlation coefficient, sets the same specific shift amount for the plurality of cyclic shift units when the direct wave is detected, and sets different shift amounts for the plurality of cyclic shift units when no direct wave is detected.

3. The wireless apparatus according to claim 2, wherein the cyclic shift control unit determines that the direct wave is detected when the value of the correlation coefficient is greater than or equal to a preset threshold value and determines that the direct wave is not detected when the value of the correlation value is smaller than the threshold value.

4. The fixed wireless access system comprising:
a first wireless apparatus according to claim 1; and
a second wireless apparatus including multiple antennas,
wherein the first wireless apparatus transmits information of a transmission mode to the second wireless apparatus when performing transmission of either beam forming or cyclic shift diversity based on a received signal, and
the second wireless apparatus performs transmission by performing beam forming or cyclic shift diversity based on the information of the transmission mode received from the first wireless apparatus.

5. A communication method used in a fixed wireless access system that performs transmission and reception in an orthogonal frequency division multiplexing (OFDM) modulation scheme, the communication method comprising:
detecting, by a wireless apparatus having multiple antennas, presence or absence of a direct wave based on signals received from the multiple antennas;
when the direct wave is detected, generating and transmitting a narrow beam by performing beam forming; and
when no direct wave is detected, performing transmission by performing cyclic shift diversity.

* * * * *